(12) United States Patent
Fukuda et al.

(10) Patent No.: US 7,385,597 B2
(45) Date of Patent: Jun. 10, 2008

(54) INFORMATION PROCESSING DEVICE WITH ROTATABLE SCREEN AND EXTERNAL INPUT DEVICE

(75) Inventors: Junko Fukuda, Kanagawa (JP); Yoshihiro Yamaguchi, Tokyo (JP); Keigo Ihara, Chiba (JP); Takanori Nishimura, Kanagawa (JP)

(73) Assignee: Sony Corporation, Tokyo (JP)

( * ) Notice: Subject to any disclaimer, the term of this patent is extended or adjusted under 35 U.S.C. 154(b) by 263 days.

(21) Appl. No.: 09/944,080

(22) Filed: Sep. 4, 2001

(65) Prior Publication Data

US 2002/0027560 A1 Mar. 7, 2002

(30) Foreign Application Priority Data

Sep. 6, 2000 (JP) ............................. 2000-270638

(51) Int. Cl.
*G06F 3/033* (2006.01)
(52) U.S. Cl. ....................... 345/184; 345/161; 345/163; 345/169; 345/173; 345/179; 348/207.11; 348/333.06; 348/376; 715/864; D14/316; D14/317
(58) Field of Classification Search ............. 348/207.1, 348/207.11, 333.06, 376; 345/184, 902; D14/316, 317; 361/681; 715/810, 864
See application file for complete search history.

(56) References Cited

U.S. PATENT DOCUMENTS

| | | | | |
|---|---|---|---|---|
| 5,208,736 A | * | 5/1993 | Crooks et al. ............... | 361/681 |
| 5,341,154 A | * | 8/1994 | Bird ............................ | 345/167 |
| 5,742,341 A | * | 4/1998 | Ohishi et al. ................ | 348/373 |
| 5,898,600 A | * | 4/1999 | Isashi ......................... | 708/105 |
| D409,583 S | * | 5/1999 | Nishida et al. ............ | D14/317 |
| 6,029,076 A | * | 2/2000 | Fiddian-Greene et al. .. | 600/353 |
| 6,144,368 A | * | 11/2000 | Ooka et al. ................ | 345/161 |
| 6,313,851 B1 | * | 11/2001 | Matthews et al. .......... | 345/718 |
| 6,546,231 B1 | * | 4/2003 | Someya et al. ............... | 455/90 |
| 6,633,336 B2 | * | 10/2003 | Toyoizumi et al. .... | 348/333.02 |
| 6,680,845 B2 | * | 1/2004 | Agata et al. ................. | 361/683 |
| 6,683,653 B1 | * | 1/2004 | Miyake et al. .............. | 348/373 |
| 6,727,917 B1 | * | 4/2004 | Chew et al. ................. | 345/765 |
| 6,933,981 B1 | * | 8/2005 | Kishida et al. ............. | 348/375 |

OTHER PUBLICATIONS

Boyce, Jim. "Microsoft Windows NT Workstation 4.0 User Manual." Que, Indianapolis, Ind. 1999. pp. 183, 186, 190.*
"Operating System." National Y2K Clearinghouse, Y2K Glossary of Terms. http://www.y2k.gov/got.html. Date accessed: May 6, 2004.*

* cited by examiner

Primary Examiner—Kee M. Tung
Assistant Examiner—Antonio A Caschera
(74) Attorney, Agent, or Firm—Oblon, Spivak, McClelland, Maier & Neustadt, P.C.

(57) ABSTRACT

In an information processing device, system operations can be simply performed while a screen of a display body is viewed, even when the display body is folded against a main body. In the information processing device, a display body with a screen arranged on the front surface is connected to a main body having a keyboard mounted thereon so as to rotate in opening/folding directions and in a turning direction, and an operating button is positioned to be operable when the back surface of the display body is close to the main body. Also, a system menu is displayed on the screen according to operation of the operating button.

24 Claims, 8 Drawing Sheets

◉ SYSTEM SETTING
    → EXTERNAL MONITOR SETTING
    → TV OUTPUT SETTING
    → LUMINANCE ADJUSTING
    → LOW-TONE EMPHASIZING SETTING
    → SILENT SETTING
    → VOLUME SETTING
    → RECORDING SETTING
    → CAMERA SETTING
    → OTHER SETTING
            → VOLUME SETTING FOR START TIME
            → DRIVING DEVICE SETTING
            → POWER-ON SYSTEM SETTING
            → SYSTEM SETTING
            → OPERATING DIAL SETTING ◉ CONVENIENT TOOL
    → ACTIVE WINDOW SWITCHING
    → DIAL-UP TOOL
    → FOLDER BROWSER
    → START MENU

◉ CLOSE FRONT WINDOW
◉ SYSTEM SUSPEND
◉ SYSTEM HYPER-NATION
◉ END

FIG. 8 ately, to an information processing device, and more particularly, to an information processing device, like a notebook personal computer, with which various kinds of operation can be simply performed even when a display body is folded against a main body.

INFORMATION PROCESSING DEVICE WITH ROTATABLE SCREEN AND EXTERNAL INPUT DEVICE

BACKGROUND OF THE INVENTION

1. Field of the Invention

This invention relates to an information processing device and more particularly, to an information processing device, like a notebook personal computer, with which various kinds of operation can be simply performed even when a display body is folded against a main body.

2. Description of the Related Art

Personal computers (hereinafter, referred to as "PC") includes a notebook personal computer (hereinafter, referred to as notebook PC) that is reduced in size and weight by integrating a liquid crystal display and a keyboard. In the notebook PC, a display body having a liquid crystal display mounted thereon is connected to a main body having a keyboard and the like mounted thereon so as to rotate in opening/folding directions. Therefore, a user can operate the keyboard, viewing the screen of the liquid crystal display, and the notebook PC can become thinner by folding the display body against the main body when non-used and carried out.

By the way, some latest notebook PCs have separate operating buttons to execute an application program for playing back a CD inserted into a compact disk read-only memory (CD-ROM) drive etc, which is capable of reproducing music even when a keyboard can not be operated due to the folded display body against the main body.

In this type of information processing devices, however, operating buttons can not be operated while a screen mounted on the display body is viewed, in the case where the display body is folded against the main body. It would be convenient, even when the display body is folded against the main body, if many kinds of system operations including setting of a hardware system could be carried out while the screen mounted on the display body is viewed.

SUMMARY OF THE INVENTION

In view of the foregoing, an object of this invention is to provide an information processing device which is capable of carrying out system operations simply while a screen of a display body is viewed even when the display body is folded against a main body.

The foregoing object and other objects of the invention have been achieved by the provision of an information processing device in which a display body having a display screen mounted on the front surface thereof is connected to a main body having a keyboard mounted thereon so as to rotate in opening/folding directions and in a turning direction, an operating means is provided at a position so as to be operable even when the back surface of the display body is at least close to the main body, and a system menu showing processing items based on an OS program is displayed according to an operation of the operating means on a display screen.

Thereby, the information processing device is capable of displaying the system menu showing the processing items based on the OS program on the display screen at any time through the operating means, which is mounted at the position so as to be operable even when the back surface of the display body is close to the main body, so that a user can simply carry out desired system operations viewing the display screen of the display body even when the display body is folded against the main body.

As described above, the present invention makes it possible to simply perform various operations such as system operations while the screen of the display body is viewed.

The nature, principle and utility of the invention will become more apparent from the following detailed description when read in conjunction with the accompanying drawings in which like parts are designated by like reference numerals or characters.

DETAILED DESCRIPTION OF THE EMBODIMENT

Preferred embodiments of this invention will be described with reference to the accompanying drawings:

(1) Embodiment

Figure 1:
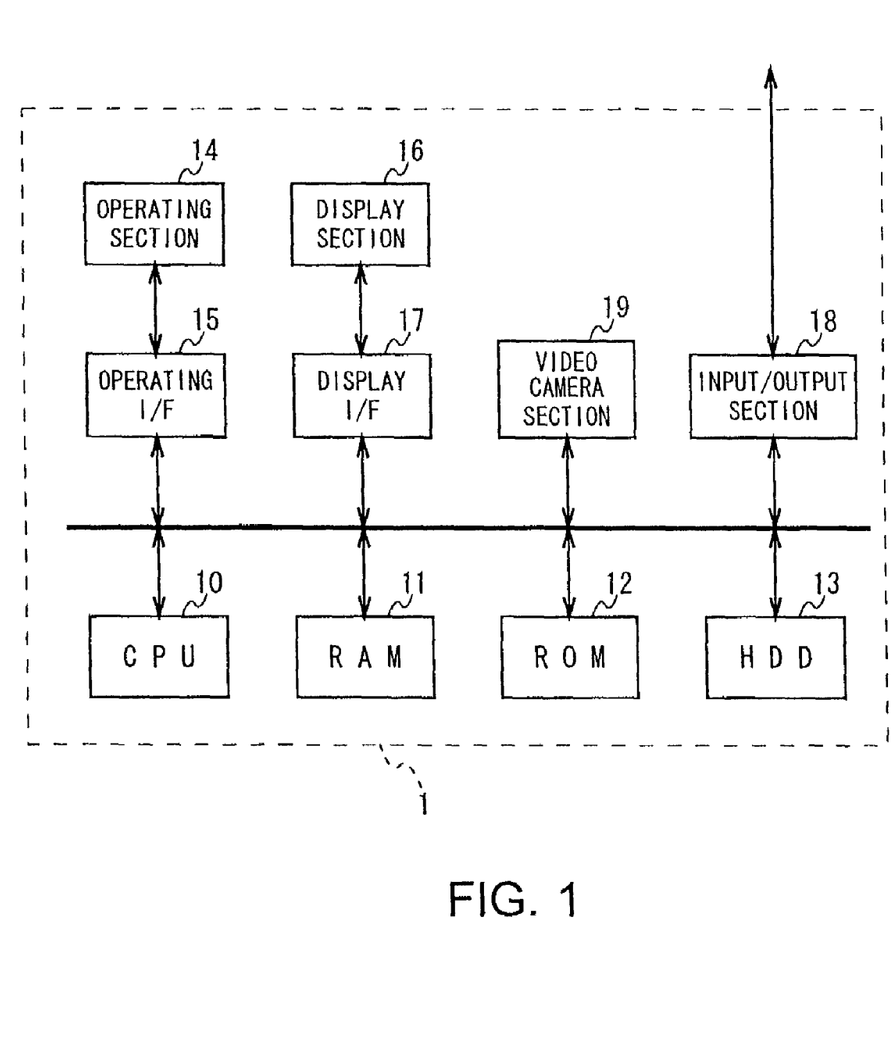
FIG. 1 is a block diagram showing an internal structure of a notebook PC according to an embodiment of the present invention.

FIG. 1 is a block diagram showing an internal structure of a notebook PC according to an embodiment of the present invention. As shown in FIG. 1, the notebook PC 1 has a central processing unit (CPU) 10 for entirely controlling the notebook PC 1, a random access memory (RAM) 11 serving as a work memory of the CPU 10, a read only memory (ROM) 12 storing a set of programs to be read out when the notebook PC 1 starts, and a hard disk drive (HDD) 13 for storing various data such as an operating system (OS) program and various kinds of application programs.

In addition, the notebook PC 1 has a keyboard with which a user inputs commands, an operating section 14 including an operating dial 32 and operating buttons B1 to B4 (refer to FIG. 2), an operating interface (operating I/F) 15 for supplying data based on operation of the operating section 14 to the CPU 10, a display section 16 which is a liquid crystal display, a display interface (display I/F) 17 for displaying various kinds of information on the display section (liquid crystal display) 16, an input/output section 18 for outputting video signals and audio signals to an external monitor and for performing data communication with an external device, and a video camera section 19 for photographing.

The CPU 10 of the PC 1 executes prescribed application programs stored in the HDD 13, to make photos with the video camera section 19, to display photographed images on the display section 16 or an external monitor, and to record them in the HDD 13, and further to edit images and so on using only the notebook PC.

Figure 2:
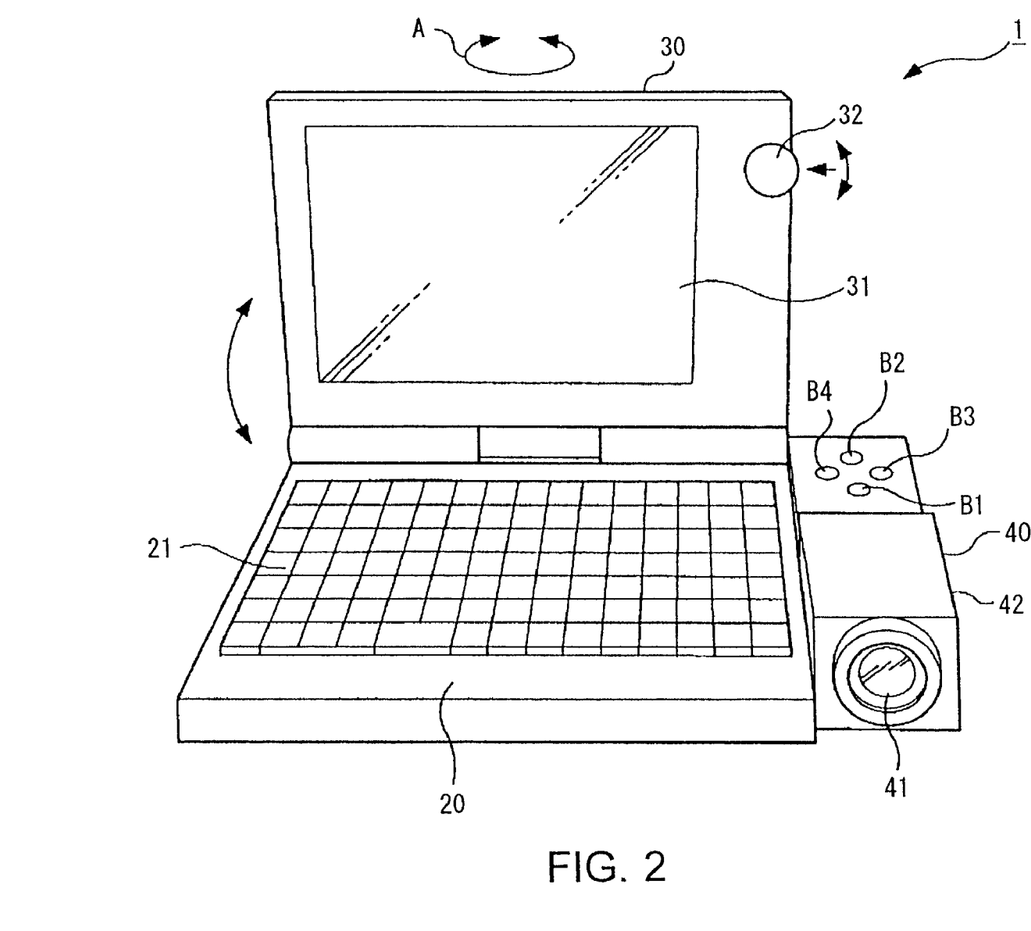
FIG. 2 is a perspective view showing an outside structure of the notebook PC.

Next, FIG. 2 is a perspective view showing an outside structure of the notebook PC 1. As shown in FIG. 2, the main body 20 of the notebook PC 1 has a keyboard 21, which is an item mounted on an ordinary notebook PC, a CD-ROM drive and an input/output terminal not shown, etc. The display body 30 has a screen 31 for displaying various kinds of information and an operating dial (second operating means) 32 which can be rotated and pressed, disposed on the right side of the screen 31. The display body 30 is supported so as to move in opening/folding directions from/against the main body 20 and is supported so as to turn in a turning direction (in a direction shown by A in this figure). Thereby the display body 30 can be opened and folded and the screen 31 of the display body 30 can be faced in a desired direction.

In addition, in the notebook PC 1, a camera body 40 containing the video camera section 19 is attached to the side (the right side) of the main body 20. The camera body 40 has functions of generating a video signal from an image inputted through a lens 41 and of generating an audio signal from sounds inputted through a stereo microphone not shown, and a case part 42 having the lens 41 fixed thereto is rotatably supported so that the lens 41 can be faced in a desired direction.

Further, four operating buttons B1, B2, B3 and B4 are provided to the camera body 40. The operating button B1 is an operating means for instructing a display of a setting menu for prescribed application programs on the screen 31, and the operating button (first operating means) B2 is an operating means for instructing a display of a system menu on the screen 31.

This system menu is an item list of processing items which are carried out based on the OS to perform system operations such as environment setting for user operation including setting of a hardware system (including system software) such as an input/output device, setting of communications and setting of a graphical user interface (GUI). It is noted that the OS includes the graphical user interface (GUI) with OS functions for Windows (by Microsoft corp.) etc.

Two other operating buttons B3 and B4 are operating means of which commands are switched for each application program or for each mode of the application program (for example, photographing mode and playback mode). Specifically, in the case of the photographing mode, their commands are switched to recording start and recording stop, while their commands are switched to playback and playback stop in the playback mode.

In the notebook PC 1, in the case where a display command of a setting menu for photographing application program is allotted to the operating button B1, pressing the operating button B1 pop-up-displays a setting menu screen showing a switching list of recording start, recording stop, playback, still picture photographing and motion picture photographing, in the center of the screen 31. Then, with respect to the operation of the setting menu being displayed, a user can rotate the operating dial 32 provided on the display body 30 to select desired processing (recording start, for example) and press the operating dial 32 to execute the selected processing.

Figure 3:
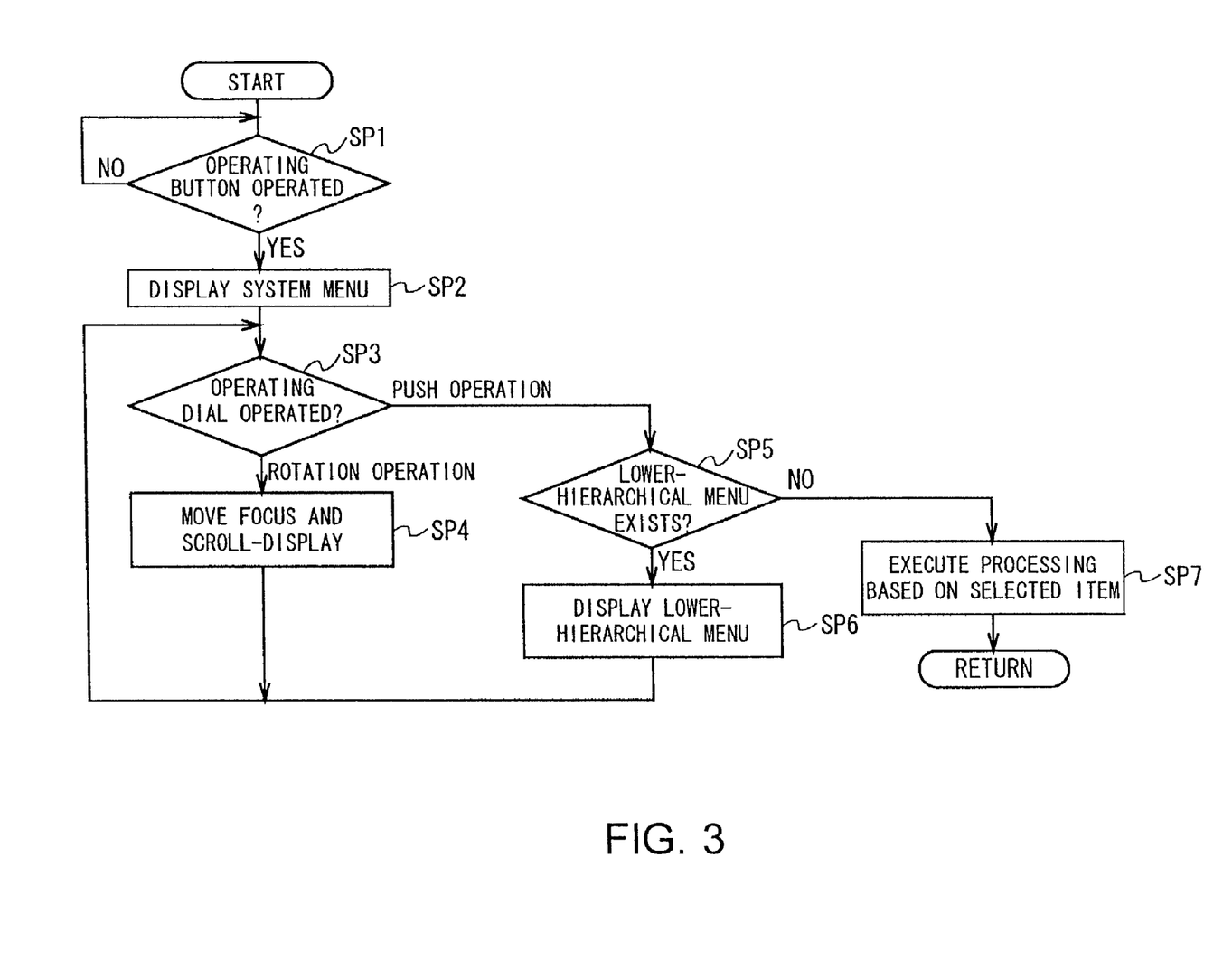
FIG. 3 is a flowchart explaining how the notebook PC works.

On the other hand, in the notebook PC 1, pressing the operating button B2 pop-up-displays the menu screen of the system menu in the center of the screen 31. Then, the operation of the system menu being displayed is performed with the operating dial 32 only, as in the case of the aforementioned setting menu. Hereinafter, the flowchart shown in FIG. 3 explains how the notebook PC 1 works when a user performs the system operations viewing the system menu.

Figure 4:
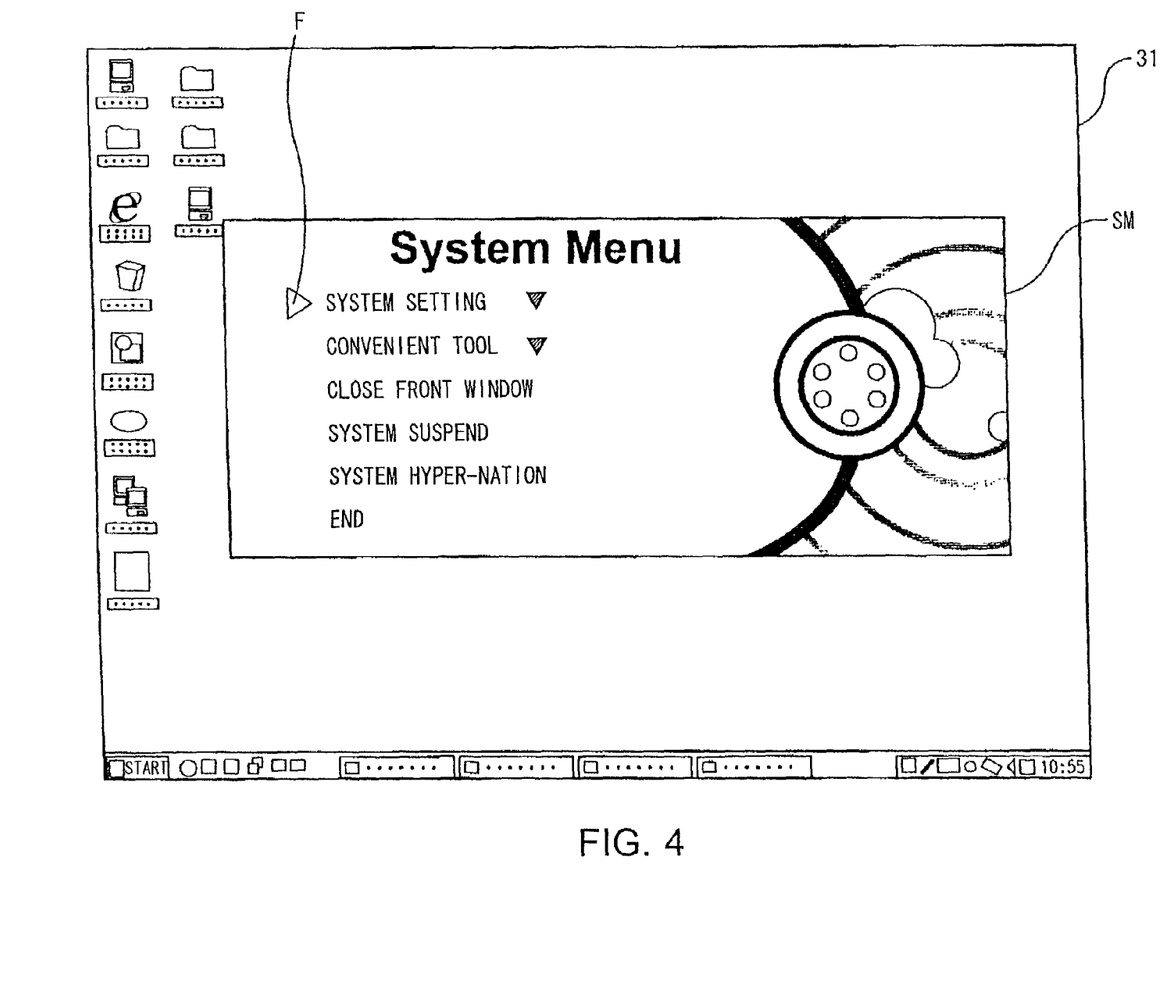
FIG. 4 is a diagram showing an initial screen displaying a system menu of the notebook PC.

At first, when the CPU 10 of the notebook PC 1 detects that a user has operated the operating button B2 (step SP1: YES), then the system menu screen SM is pop-up-displayed in the center of the screen 31 as shown in FIG. 4 (step SP2). As shown in this figure, the initial screen of the system menu screen SM shows an item for selecting system setting ("system setting"), an item for selecting processing functions to be executed by Windows (by Microsoft corp.) etc. ("convenient tool"), and items for selecting other functions (power saving mode etc.) to be executed by Windows (by Microsoft corp.) etc. ("close front window", "system suspend", "system hibernation", "end").

Figure 5:
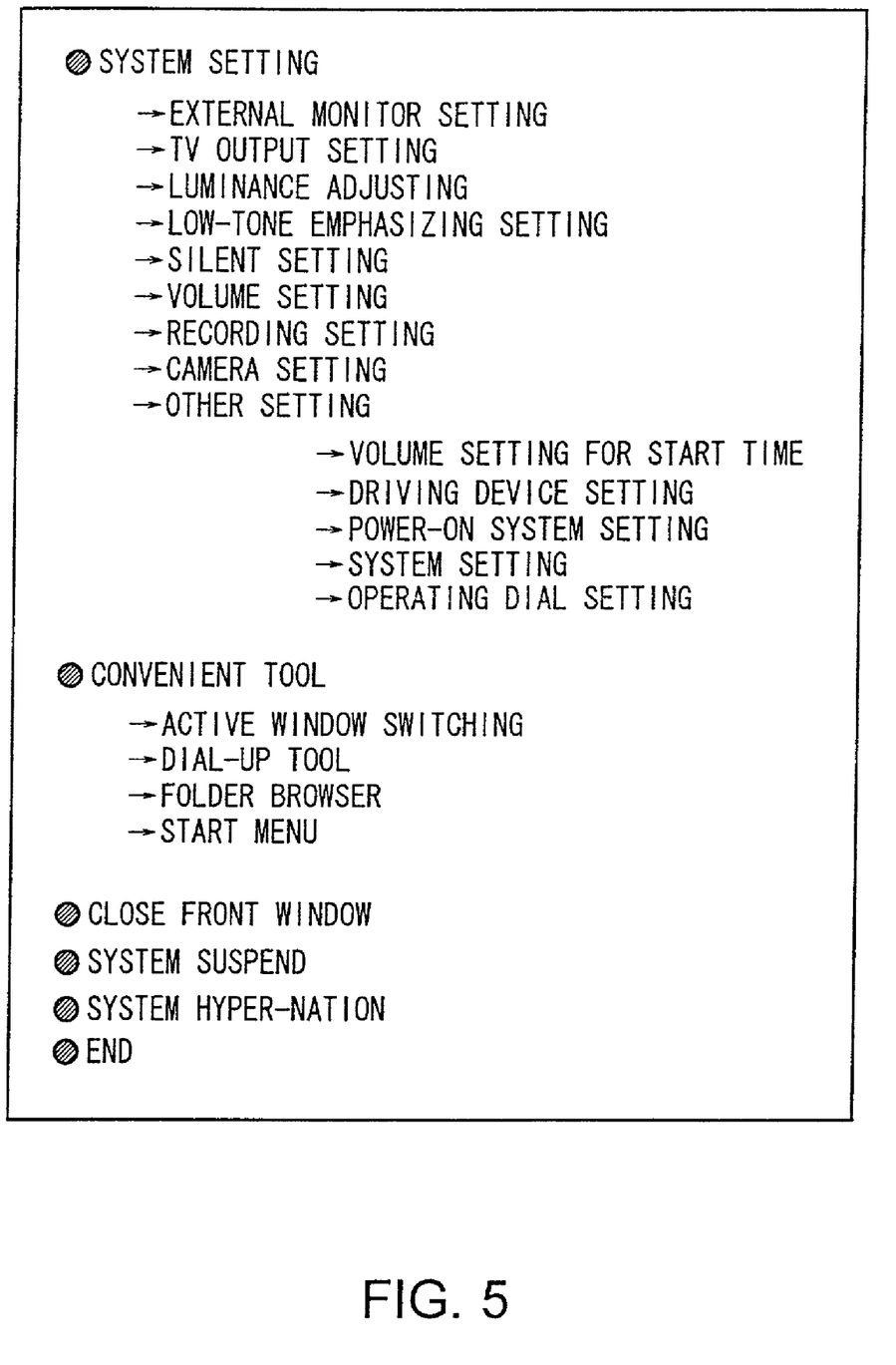
FIG. 5 is a diagram showing all items of the system menu of the notebook PC.

FIG. 5 is a diagram showing all items of the system menu in a hierarchical structure form. As shown in FIG. 4 and FIG. 5, the initial screen of the system menu screen SM shows only the uppermost-hierarchical items (items each having a filled dot in FIG. 5) and items ("system setting", "convenient tool") having lower-hierarchical items are displayed with a predetermined mark (filled triangle, for example) (refer to FIG. 4).

Next, the CPU 10 of the notebook PC 1 detects that the user has rotated the operating dial 32 (step SP3: rotation operation), a focus F moves between items according to the rotation operation on the system menu screen SM (step SP4). When there exist hidden items in the system menu screen SM, the items on the screen SM are scroll-displayed.

Figure 6:
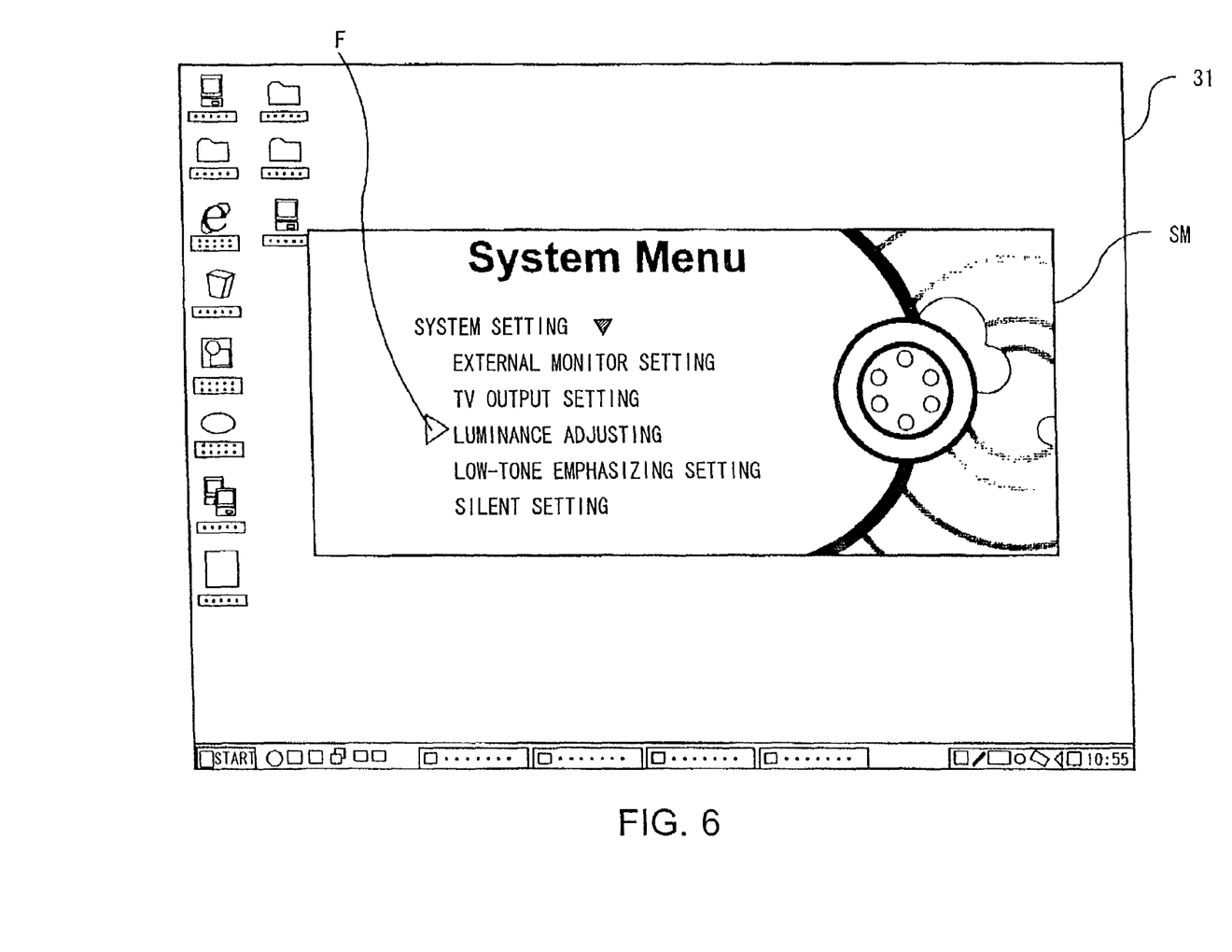
FIG. 6 is a diagram showing a screen displaying the system menu of the notebook PC.

On the other hand, when the CPU 10 detects that the user has pushed the operating dial 32 (step SP3: push operation), it is judged whether the item selected by the focus F has lower hierarchical items (step SP5). When it is determined that there are lower-hierarchical items (step SP5: YES), the lower-hierarchical items are additionally displayed on the system menu screen SM (step SP6). Specifically, when the "system setting" is selected, an item for switching an external output ("external monitor setting"), an item for output-setting to a TV (television) ("TV output setting"), an item for adjusting luminance of screen ("luminance adjusting"), an item for volume setting ("low-tone emphasizing setting", "volume setting", "silent setting", "recording setting"), an item for setting the video camera section 19 ("camera setting"), and another item ("other setting") are added as shown in FIG. 6 (refer to FIG. 5). It is noted that hidden items from the system screen SM in FIG. 6 are displayed by rotating the operating dial 32 as described above (step SP4).

When "convenient tool" is selected, an item for switching the front window ("active window switching"), an item for performing a dial-up connection ("dial-up tool"), an item for browsing folders ("folder browser"), an item for displaying the start menu ("start menu") etc. are additionally displayed (refer to FIG. 5). When "other setting" is selected out of the lower-hierarchical items of "system setting", an item for setting for the time when the notebook PC 1 starts ("volume setting for start time" etc.), an item for instructing a display of system information ("system information"), etc. are additionally displayed (refer to FIG. 5). It is noted that a menu screen can be displayed for each hierarchy, instead of the aforementioned method of displaying the system menu in a hierarchical structure form.

When the CPU 10 detects that the user has pressed the operating dial 32 to select an item having no lower-hierarchical item (step SP5: NO), a setting screen corresponding to the item is displayed or corresponding processing is carried out (Step SP7). As described above, the user can select a desired item from the system menu to execute a desired system operation.

In addition, in the notebook PC 1, when an item having no lower-hierarchical menu is selected by pushing the operating dial 32, when the operating button B1 or B2 for instructing a display of a menu is pressed while a menu screen is displayed, when preset time passes after a menu screen is displayed, or when another window is selected, the CPU 10 cancels the display of the menu screen. It is noted that a cancel command of a menu screen may be allotted to a prescribed key or a simultaneous operation of multiple keys (that is, a short-cut key).

Next, transformations of the notebook PC 1 will be described.

As shown in FIGS. 7A to 7D, there are four transformations of the notebook PC1 by moving the display body 30 and changing a slant of the case part 42 of the camera body 40.

Figure 7A:
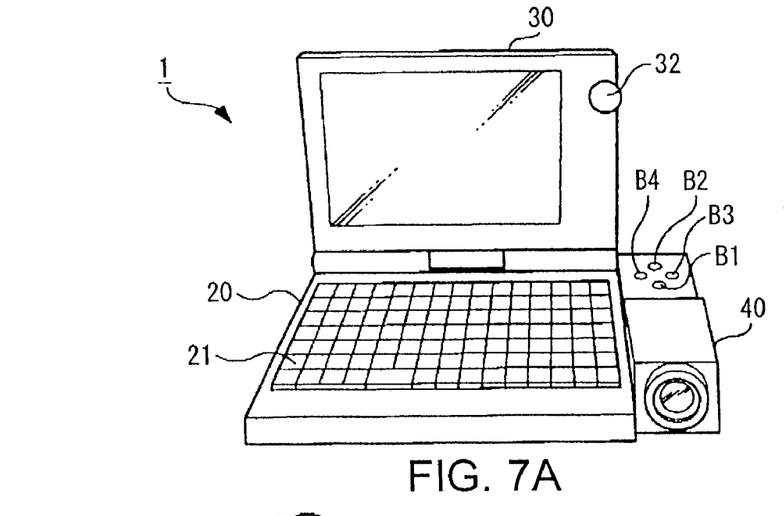
FIGS. 7A to 7D are perspective views showing four transformations of the notebook PC for photographing.

That is, FIG. 7A shows the same form as when a notebook PC is normally used. The user can operate the keyboard 21 viewing the screen 31, and simply photographs an object close to the operator (user) of the keyboard 21. In this form, the user can operate the keyboard 21, an inputting device such as a mouse connected to the notebook PC 1, and the operating buttons B1 to B4 and the operating dial 32, viewing the screen 31.

Figures 7B, 7D:
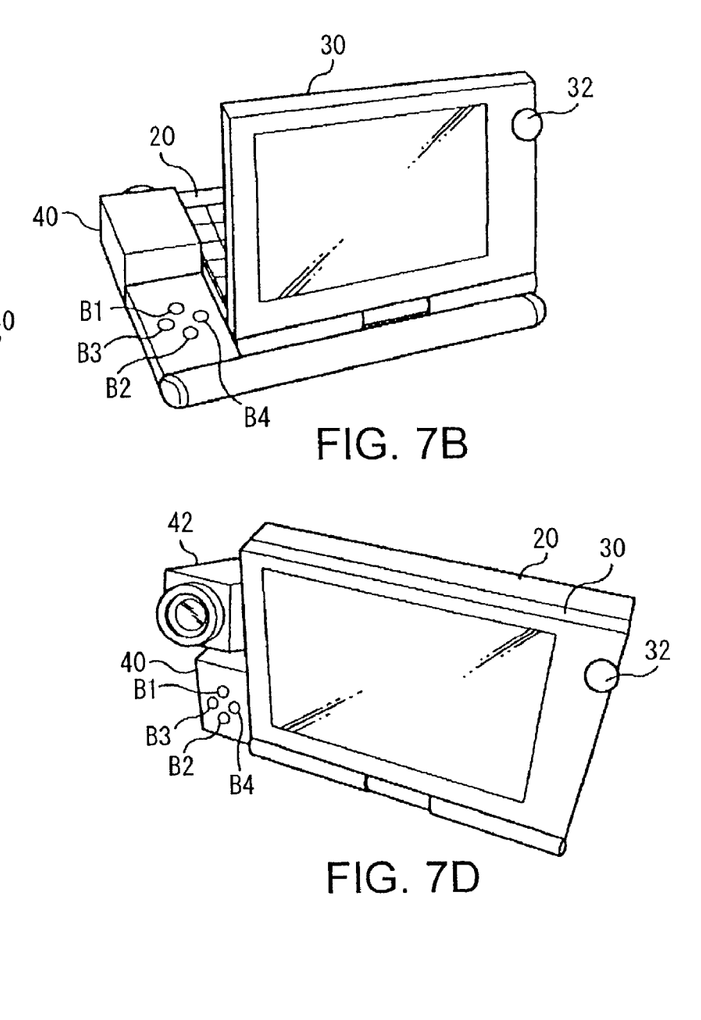

Next, FIG. 7B shows the form for photographing with a tripod attached to a tripod fixing part (not shown) at the bottom of the main body 20, and the screen 31 of the display body 30 faces in the direction opposite to the keyboard. 21. Thereby, a user can photograph landscapes etc. monitoring photographed images on the screen 31. This case also allows the user to operate the operating buttons B1 to B4 and the operating dial 32 viewing the screen 31.

Figure 7C:
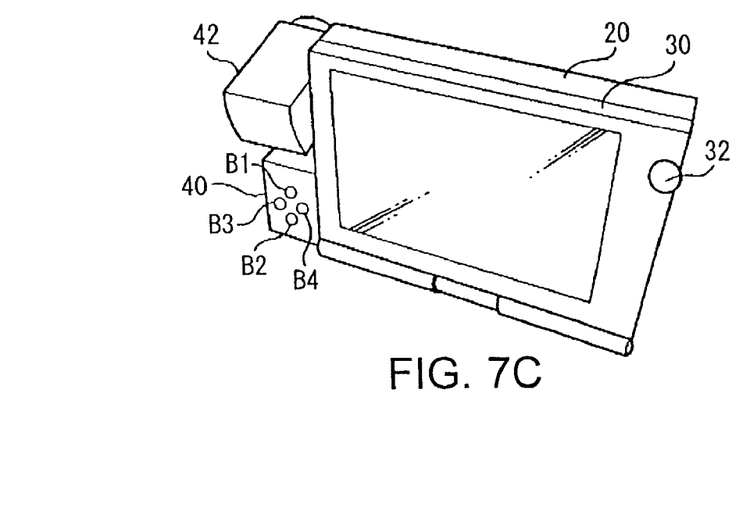

FIG. 7C shows the form for the case where the notebook PC 1 is held by hands to photograph an object (other than a photographer), in which the display body 30 is folded against the main body 20 with the opposite side to the screen 31 (the back side) of the display body 30 close to the main body 20. This form makes the notebook PC 1 smaller (thinner), so that it is easy to carry. Further, FIG. 7D shows the form for the case where a photographer photographs himself (photographer) holding the notebook PC 1 by hands, and differs in the direction of the case part 42 of the camera body 40 from the form shown in FIG. 7C. Under the forms shown in FIGS. 7C and 7D, the user can view the screen 31 but can not operate the keyboard 21 because the keyboard 21 is placed behind. These forms, however, allow the user to operate the operating buttons B1 to B4 and the operating dial 32.

Note that, the notebook PC 1 is provided with a detecting switch (not shown) for detecting the turning of the display body 30 and the slant of the case part 42, and the up and down of images to be output from the video camera section 19, the right and left of sounds to be output and sounds to be input, and the up, down, right and left of photographed images to be displayed on the screen 31 are each automatically switched to be suitable for a photographing situation, according to the detection result by the detecting switch.

As described above, the user can operate the operating buttons B1 to B4 and the operating dial 32 viewing the screen 31 under any form. Therefore, in the notebook PC 1, even when the display body 30 is folded against the main body 20, the setting menu and the system menu can be displayed on the screen 31 which is a large screen disposed on the display body 30, and also a desired item can be selected only by operating the operating dial 32, so that the user can simply perform a desired system operation. Note that, the setting menu and the system menu allow the user to customize the menu items by addition and deletion.

(2) Modification (2-1) First Modification

The aforementioned embodiment has described the case where the present invention is applied to a notebook PC previously having a photographing function. The present invention, however, is not limited to this and can be widely applied to notebook PCs without the photographing function (camera body 40). In short, the present invention can be applied to such a device that at least an operating button B2 for instructing a display of a system menu or the like and an operating dial 32 for performing selection can be operated when a display body is too close to a main body to operate a keyboard.

Figure 8:
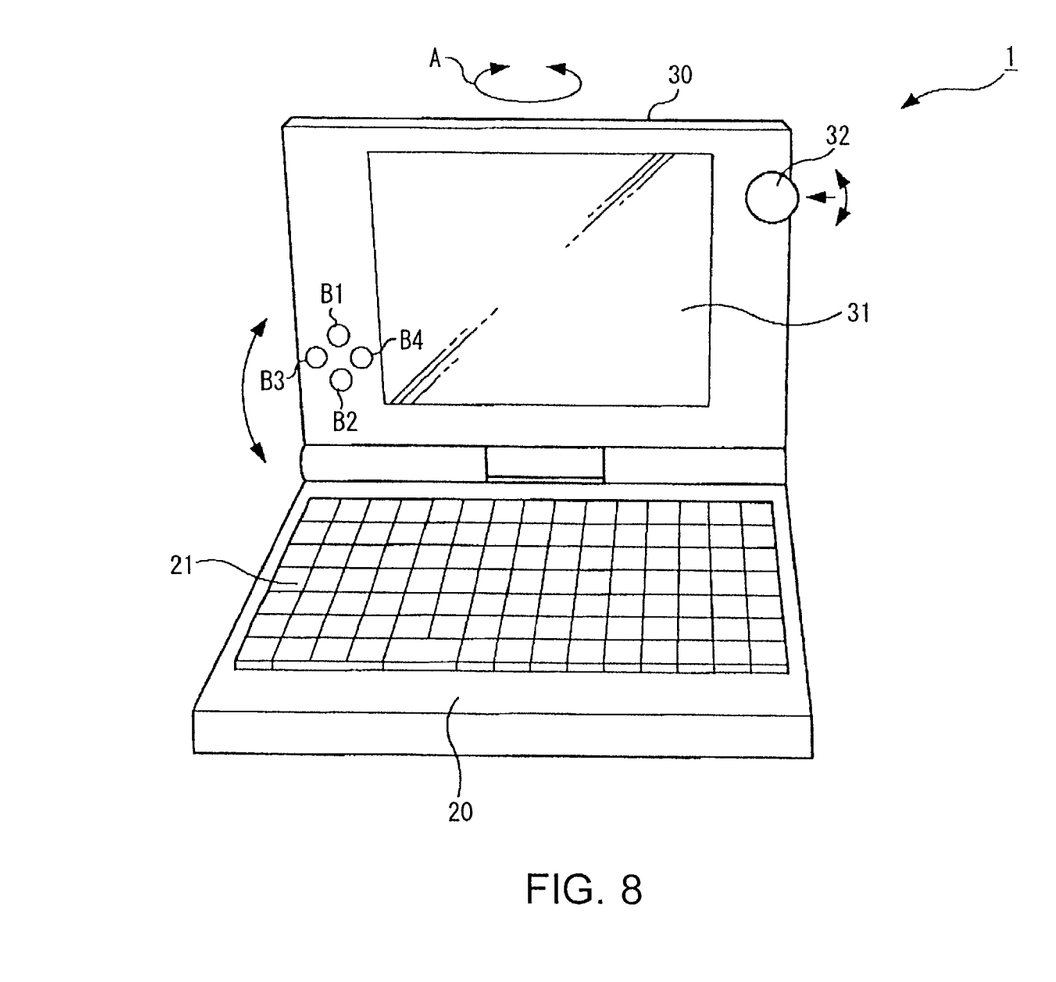
FIG. 8 is a perspective view showing an outside structure of a notebook PC according to a first modification.

For example, when the operating buttons B1 to B4 are arranged on the left side of the screen 31 of the display body 30 as shown in FIG. 8, a user can always operate the operating buttons B1 to B4 with his left hand and operate the operating dial 32 with his right hand, viewing the screen 31. Therefore, the user can perform the system operations simply even when the display body 30 is folded against the main body 20. Note that, only the operating button B2 is sufficient to perform only system operations.

(2-2) Second Modification

The aforementioned embodiment has described the case where the present invention is applied to the notebook PC. The present invention, however, is not limited to this and can be widely applied to portable telephones and information processing devices generally called personal digital assistants (PDA) which do not allow a keyboard to be operated when a display body is folded against a main body.

While descriptions have been provided in connection with the preferred embodiments of the invention, it will be obvious to those skilled in the art that various changes and modifications may be made to cover in the appended claims all such changes and modifications that fall within the true spirit and scope of the invention.

What is claimed is:

1. An information processing device for executing various kinds of information processing, said information processing device comprising:

a main body having a keyboard mounted thereon;

a display body with a display screen arranged on a front surface, which is connected to said main body to rotate in opening/folding directions and to rotate in a turning direction different from the opening/folding directions, to be in a closed position in which the display body covers the keyboard, an open position in which the display screen faces the keyboard, or a turned rotated position in which the display body is turned and rotated, a back surface of the display screen is close to said main body, and the display screen is on an opposite side as the keyboard;

first operating means and second operating means, one of said first and second operating means is provided outside of said display body, separate from the keyboard and adjacent to the keyboard, for operating the information processing device disposed at a position to be operable when said display body is in each of the open position and turned rotated position, and the other of said first and second operating means is provided on the display body but outside of and operating independently of contact with said display screen, for operating the information processing device disposed at a position to be operable when said display body is in the turned rotated position, wherein the at least first operating means and the second operating means are positioned on a same left or right side of the display screen when the display body is in the open position, and when the back surface of said display body is in the turned rotated position the second operating means is positioned on an opposite left or right side of the display screen as the at least first operating means;

and display control means for displaying a system menu showing processing items on said display screen based on an operation of said first operating means, wherein said first operating means includes at least an operating button, said second operating means includes an operating device dedicated for displaying of the system menu showing processing items and said operating device is dedicated for selecting the processing items.

2. The information processing device according to claim 1, wherein:

said first operating means can be pressed; and said second operating means can be rotated and pressed.

3. The information processing device according to claim 1, further comprising display control means for displaying a system menu showing processing items based on an operating system (OS) program on said display screen based on an operation of said first operating means, and wherein said display control means cancels a display of said system menu when at least one of following conditions occurs: where said first operating means is operated while said system menu is displayed; where preset time passes after said system menu is displayed; where a processing item to be executed is selected from said system menu; and where prescribed operating means including said keyboard is operated.

4. The information processing device according to claim 1, further comprising display control means for displaying a system menu showing processing items based on an operating system (OS) program on said display screen based on an operation of said first operating means, and wherein said display control means displays at least one processing item out of a processing item relating to input/output setting of said information processing device, a processing item relating to a graphical user interface (GUI), and a processing item relating to operation modes of the information processing device, as the processing items to be displayed in said system menu.

5. An information processing device for executing various kinds of information processing, said information processing device comprising:

a main body having a keyboard mounted thereon;

a display body with a display screen arranged on a front surface, which is connected to said main body to rotate in opening/folding directions and to rotate in a turning direction different from the opening/folding directions, to be in a closed position in which the display body covers the keyboard, an open position in which the display screen faces the keyboard, or a turned rotated position in which the display body is turned and rotated, a back surface of the display screen is close to said main body, and the display screen is on an opposite side as the keyboard;

a photographing case having a photographing function;

first operating means and second operating means, one of said first and second operating means is provided outside of said display body, separate from the keyboard and adjacent to the keyboard, for operating the information processing device arranged at a position to be operable under a photographing condition where said display body is in each of the open position and turned rotated position, and the other of said first and second operating means is provided on the display body but outside of and operating independently of contact with said display screen, for operating the information processing device arranged at a position so as to be operable under the photographing condition where said display body is in the turned rotated position, wherein the at least first operating means and the second operating means are positioned on a same left or right side of the display screen when the display body is in the open position, and in the photographing condition when said display body is in the turned rotated position the second operating means is positioned on an opposite left or right side of the display screen as the at least first operating means; and display control means for displaying a system menu showing processing items on said display screen based on an operation of said first operating means, wherein said first operating means includes at least an operating button, said second operating means includes an operating device dedicated for displaying of the system menu showing processing items and said operating device is dedicated for selecting the processing items.

6. The information processing device according to claim 5, wherein:

said first operating means can be pressed; and said second operating means can be rotated and pressed.

7. An information processing device for executing various kinds of information processing, said information processing device comprising:

a main body having a keyboard mounted thereon;

a display body with a display screen arranged on a front surface, which is connected, to said main body to rotate in opening/folding directions and to rotate in a turning direction different from the opening/folding directions, to be in a closed position in which the display body covers the keyboard, an open position in which the display screen faces the keyboard, or a turned rotated position in which the display body is turned and rotated, a back surface of the display screen is close to said main body, and the display screen is on an opposite side as the keyboard;

first operating unit and a second operating unit, one of said first and second operating units is provided outside of said display body, separate from the keyboard and adjacent to the keyboard, configured to operate the information processing device disposed at a position to be operable when said display body is in each of the open position and turned rotated position, and the other of said first and second operating units is provided on the display body but outside of and operating independently of contact with said display screen, configured to operate the information processing device disposed at a position to be operable when said display body is in the turned rotated position, wherein the at least first operating unit and the second operating unit are positioned on a same left or right side of the display screen when the display body is in the open position, and when the back surface of said display body is in the turned rotated position the second operating unit is positioned on an opposite left or right side of the display screen as the at least first operating unit; and a display controller configured to display a system menu showing processing items on said display screen based on an operation of said first operating unit, wherein said first operating unit includes at least an operating button, said second operating unit includes an operating device dedicated for displaying of the system menu showing processing items and said operating device is dedicated for selecting the processing items.

8. The information processing device according to claim 7, wherein:

said first operating unit includes a button which can be pressed; and said second operating unit includes a dial which can be rotated and pressed.

9. The information processing device according to claim 7, further comprising a display controller configured to display a system menu showing processing items based on an operating system (OS) program on said display screen based on an operation of said first operating unit, and wherein said display controller cancels a display of said system menu when at least one of following conditions occurs: where said first operating unit is operated while said system menu is displayed; where preset time passes after said system menu is displayed; where a processing item to be executed is selected from said system menu; and where a prescribed operating unit including said keyboard is operated.

10. The information processing device according to claim 7, further comprising a display controller configured to display a system menu showing processing items based on an operating system (OS) program on said display screen based on an operation of said first operating unit, and wherein said display controller displays at least one processing item out of a processing item relating to input/output setting of said information processing device, a processing item relating to a graphical user interface (GUI), and a processing item relating to operation modes of the information processing device, as the processing items to be displayed in said system menu.

11. An information processing device for executing various kinds of information processing, said information processing device comprising:

a main body having a keyboard mounted thereon;

a display body with a display screen arranged on the front surface, which is connected to said main body to rotate in opening/folding directions and to rotate in a turning direction different from the opening/folding directions, to be in a closed position in which the display body covers the keyboard, an open position in which the display screen faces the keyboard, or a turned rotated position in which the display body is turned and rotated, a back surface of the display screen is close to said main body, and the display screen is on an opposite side as the keyboard;

a photographing case having a photographing function;

first operating unit and a second operating unit, one of said first and second operating units is provided outside of said display body, separate from the keyboard and adjacent to the keyboard, configured to operate the information processing device arranged at a position to be operable under a photographing condition when said display body is in each of the open position and turned rotated position, and the other of said first and second operating units is provided on the display body but outside of and operating independently of contact with said display screen, configured to operate the information processing device positioned to be operable under the photographing condition when said display body is in the turned rotated position, wherein the at least first operating unit and the second operating unit are positioned on a same left or right side of the display screen when the display body is in the open position, and in the photographing condition when said display body is in the turned rotated position the second operating unit is positioned on an opposite left or right side of the display screen as the at least first operating unit; and a display controller configured to display a system menu showing processing items on said display screen based on an operation of said first operating unit, wherein said first operating unit includes at least an operating button, said second operating unit includes an operating device dedicated for displaying of the system menu showing processing items and said operating device is dedicated for selecting the processing items.

12. The information processing device according to claim 11, wherein:

said first operating unit includes a button which can be pressed; and said second operating unit includes a dial which can be rotated and pressed.

13. An information processing device for executing various kinds of information processing, said information processing device comprising:

a main body having a keyboard mounted thereon;

a display body with a display screen arranged on a front surface, which is connected to said main body to rotate in opening/folding directions and to rotate in a turning direction different from the opening/folding directions, to be in a closed position in which the display body covers the keyboard, an open position in which the display screen faces the keyboard, or a turned rotated position in which the display body is turned and rotated, a back surface of the display screen is close to said main body, and the display screen is on an opposite side as the keyboard;

first operating means and second operating means, one of said first and second operating means is provided outside of said display body, separate from the keyboard and adjacent to the keyboard, for operating the information processing device disposed at a position to be operable when said display body is in each of the open position and turned rotated position, and the other of said first and second operating means is provided on the display body but outside of and operating independently of contact with said display screen, for operating the information processing device positioned to be operable when said display body is in the turned rotated position, wherein the at least first operating means and the second operating means are positioned on a same left or right side of the display screen when the display body is in the open position, and when said display body is in the turned rotated position the second operating means is positioned on an opposite left or right side of the display screen as the at least first operating means; and display control means for displaying a system menu showing processing items on said display screen based on an operation of said first operating means, wherein said first operating means includes at least an operating button, said second operating means includes an operating device dedicated for displaying of the system menu showing processing items and said operating device is dedicated for selecting the processing items.

14. The information processing device according to claim 13, wherein:
said first operating means can be pressed; and
said second operating means can be rotated and pressed.

15. The information processing device according to claim 13, further comprising display control means for displaying a system menu showing processing items based on an operating system (OS) program on said display screen based on an operation of said first operating means, and wherein
said display control means cancels a display of said system menu when at least one of following conditions occurs: where said first operating means is operated while said system menu is displayed; where preset time passes after said system menu is displayed; where a processing item to be executed is selected from said system menu; and where a prescribed operating means including said keyboard is operated.

16. The information processing device according to claim 13, further comprising display control means for displaying a system menu showing processing items based on an operating system (OS) program on said display screen based on an operation of said first operating means, and wherein
said display control means displays at least one processing item out of a processing item relating to input/output setting of said information processing device, a processing item relating to a graphical user interface (GUI), and a processing item relating to operation modes of the information processing device, as the processing items to be displayed in said system menu.

17. An information processing device for executing various kinds of information processing, said information processing device comprising:
a main body having a keyboard mounted thereon;
a display body with a display screen arranged on the front surface, which is connected to said main body to rotate in opening/folding directions and to rotate in a turning direction different from the opening/folding directions, to be in a closed position in which the display body covers the keyboard, an open position in which the display screen faces the keyboard, or a turned rotated position in which the display body is turned and rotated, a back surface of the display screen is close to said main body, and the display screen is on an opposite side as the keyboard;
a photographing case having a photographing function;
first operating means and second operating means, one of said first and second operating means is provided outside of said display body, separate from the keyboard and adjacent to the keyboard, for operating the information processing device positioned to be operable under a photographing condition when said display body is in each of the open position and turned rotated position, and the other of said first and second operating means is provided on the display body but outside of and operating independently of contact with said display screen, operating the information processing device positioned to be operable under the photographing condition when said display body is in the turned rotated position, wherein the at least first operating means and the second operating means are positioned on a same left or right side of the display screen when the display body is in the open position, and in the photographing condition when said display body is in the turned rotated position the second operating means is positioned on an opposite left or right side of the display screen as the at least first operating means; and
display control means for displaying a system menu showing processing items on said display screen based on an operation of said first operating means, wherein
said first operating means includes at least an operating button, said second operating means includes an operating device dedicated for displaying of the system menu showing processing items and said operating device is dedicated for selecting the processing items.

18. The information processing device according to claim 17, wherein:
said first operating means can be pressed; and
said second operating means can be rotated and pressed.

19. An information processing device for executing various kinds of information processing, said information processing device comprising:
a main body having a keyboard mounted thereon;
a display body with a display screen arranged on a front surface, which is connected to said main body to rotate in opening/folding directions and to rotate in a turning direction different from the opening/folding directions, to be in a closed position in which the display body covers the keyboard, an open position in which the display screen faces the keyboard, or a turned rotated position in which the display body is turned and rotated, a back surface of the display screen is close to said main body, and the display screen is on an opposite side as the keyboard;
first operating unit and a second operating unit, one of said first and second operating units is provided outside of said display body, separate from the keyboard and adjacent to the keyboard, configured to operate the information processing device positioned to be operable when said display body is in each of the open position and turned rotated position, and the other of said first and second operating units is provided on the display body but outside of and operating independently of contact with said display screen, positioned to be operable when said display body is in the turned rotated position, wherein the at least first operating unit and the second operating unit are positioned on a same left or right side of the display screen when the display body is in the open position, and when said display body is in the turned rotated position the second operating unit is positioned on an opposite left or right side of the display screen as the at least first operating unit; and
a display controller configured to display a system menu showing processing items on said display screen based on an operation of said first operating unit, wherein
said first operating unit includes at least an operating button, said second operating unit includes an operating device dedicated for displaying of the system menu showing processing items and said operating device is dedicated for selecting the processing items.

20. The information processing device according to claim 19, wherein:
said first operating unit includes a button which can be pressed; and
said second operating unit includes a dial which can be rotated and pressed.

21. The information processing device according to claim 19, further comprising a display controller configured to display a system menu showing processing items based on an operating system (OS) program on said display screen based on an operation of said first operating unit, and wherein said display controller cancels a display of said system menu when at least one of following conditions occurs: where said first operating unit is operated while said system menu is displayed; where preset time passes after said system menu is displayed; where a processing item to be executed is selected from said system menu; and where a prescribed operating unit including said keyboard is operated.

22. An information processing device for executing various kinds of information processing, said information processing device comprising:

a main body having a keyboard mounted thereon;

a display body with a display screen arranged on the front surface, which is connected to said main body to rotate in opening/folding directions and to rotate in a turning direction different from the opening/folding directions, to be in a closed position in which the display body covers the keyboard, an open position in which the display screen faces the keyboard, or a turned rotated position in which the display body is turned and rotated, a back surface of the display screen is close to said main body, and the display screen is on an opposite side as the keyboard;

a photographing case having a photographing function;

first operating unit and a second operating unit, one of said first and second operating units is provided outside of said display body, separate from the keyboard and adjacent to the keyboard, configured to operate the information processing device positioned to be operable under a photographing condition when said display body is in each of the open position and turned rotated position, and the other of said first and second operating units is provided on the display body but outside of and operating independently of contact with said display screen, configured to operate the information processing device positioned to be operable under the photographing condition when said display body is in the turned rotated position, wherein the at least first operating unit and the second operating unit are positioned on a same left or right side of the display screen when the display body is in the open position, and in the photographing condition when said display body is in the turned rotated position the second operating unit is positioned on an opposite left or right side of the display screen as the at least first operating unit; and a display controller configured to display a system menu showing processing items on said display screen based on an operation of said first operating unit, wherein said first operating unit includes at least an operating button, said second operating unit includes an operating device dedicated for displaying of the system menu showing processing items and said operating device is dedicated for selecting the processing items.

23. The information processing device according to claim 22, wherein:

said first operating unit includes a button which can be pressed; and said second operating unit includes a dial which can be rotated and pressed.

24. The information processing device according to claim 22, further comprising a display controller configured to display a system menu showing processing items based on an operating system (OS) program on said display screen based on an operation of said first operating unit, and wherein said display controller displays at least one processing item out of a processing item relating to input/output setting of said information processing device, a processing item relating to a graphical user interface (GUI), and a processing item relating to operation modes of the information processing device, as processing items to be displayed in said system menu.

* * * * *